Sept. 18, 1956  S. GOLDEN  2,763,127
JET PROPELLED DEVICE
Filed Jan. 27, 1945  3 Sheets-Sheet 3
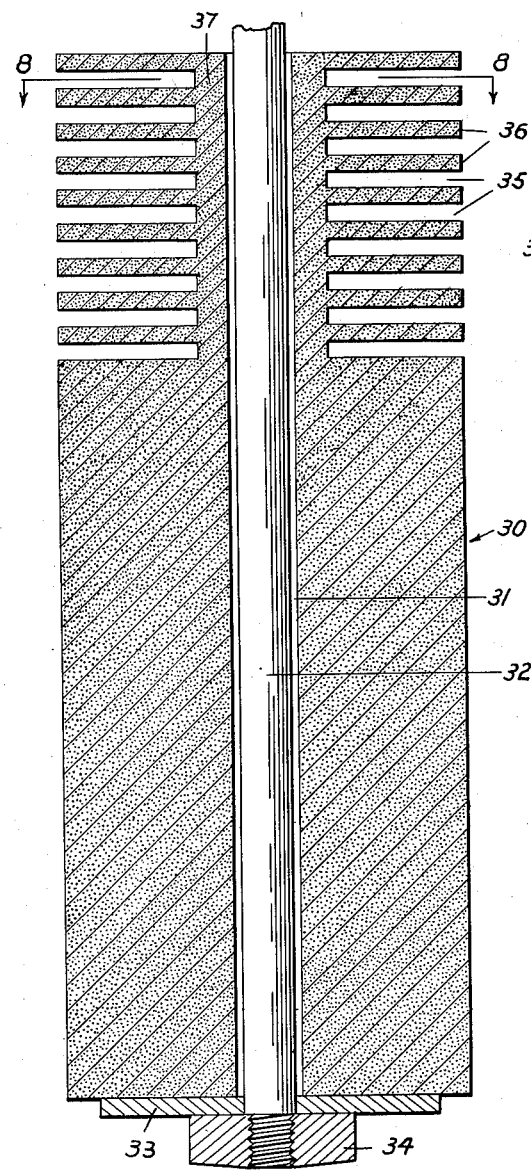
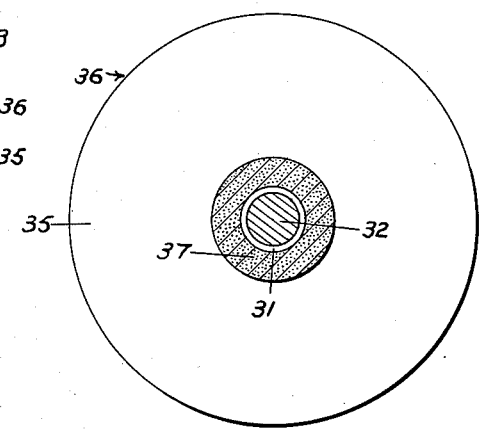
Inventor
Sidney Golden
By C. E. Herrstrom & H. E. Thibodeau
Attorneys

United States Patent Office 2,763,127
Patented Sept. 18, 1956

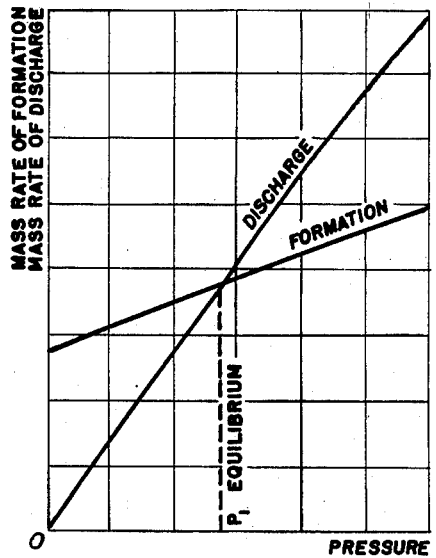
FIG.1
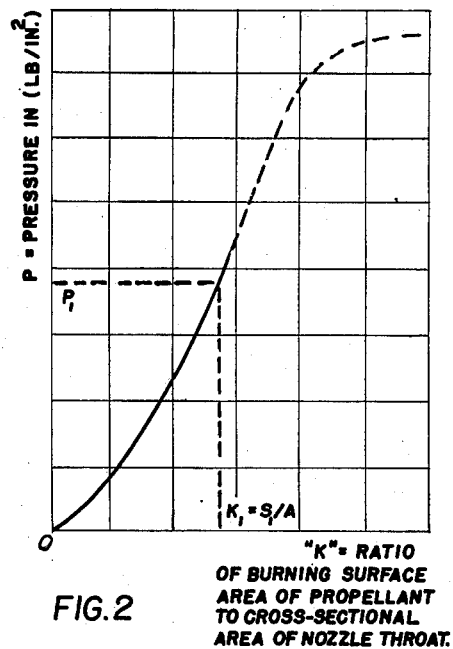
FIG.2 "K" = RATIO OF BURNING SURFACE AREA OF PROPELLANT TO CROSS-SECTIONAL AREA OF NOZZLE THROAT.
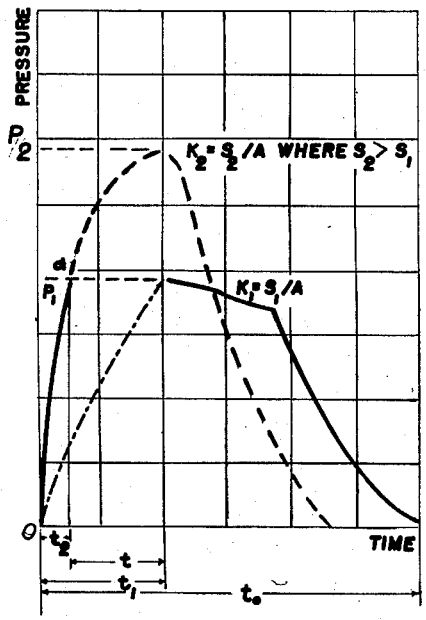
FIG.3
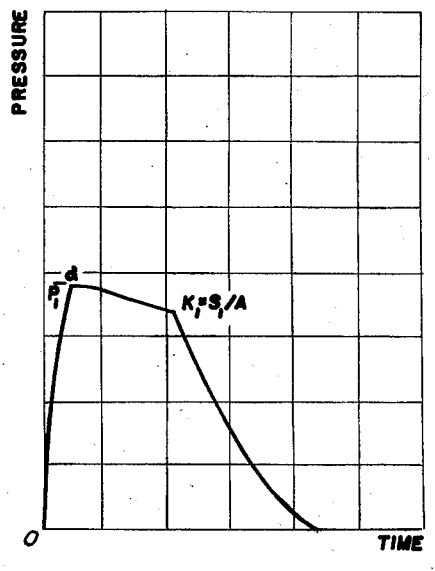
FIG.4
INVENTOR
SIDNEY GOLDEN

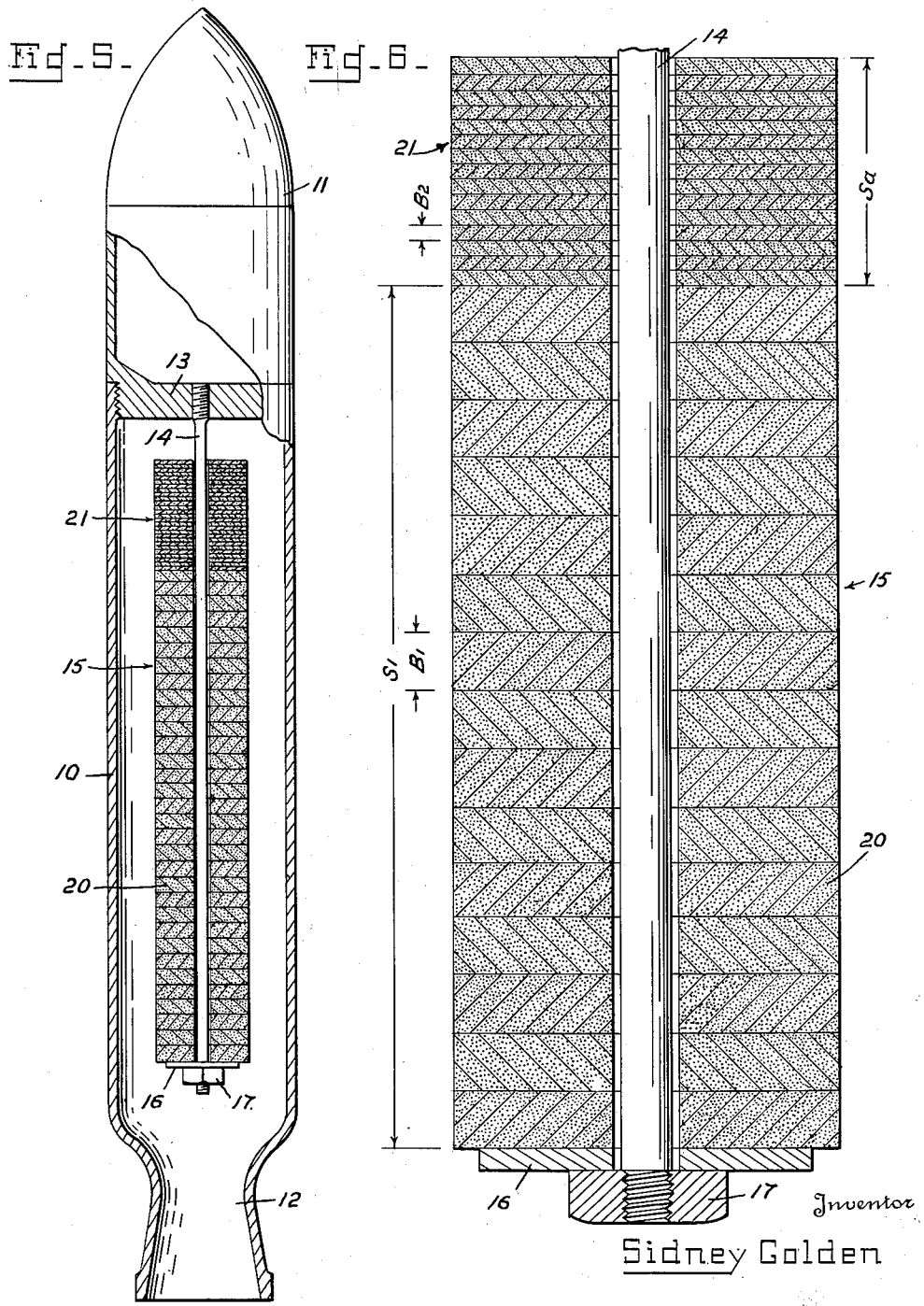

2,763,127

JET PROPELLED DEVICE

Sidney Golden, Cumberland, Md., assignor to the United States of America as represented by the Secretary of War Application January 27, 1945, Serial No. 574,934

6 Claims. (Cl. 60—35.6)

This invention relates to propellants and especially to propellants for jet propelled devices, such as rockets adapted for military purposes and it comprises a propellent assembly which among many other advantages permits great latitude in design. This invention more specifically comprises providing within a rocket motor combustion chamber a propellant having a plurality of powder burning surfaces at least some of which are laminar, and of different web thickness.

By virtue of this invention I am able to control the time required to attain a desired pressure within the rocket motor combustion chamber and to provide an extremely short time for attaining this desired pressure without increasing the maximum operating pressure within the combustion chamber. I have been able to accomplish this result by providing a large surface area of propellant during that portion of the total burning time required to attain the desired pressure, and by providing an abrupt change to a different and much smaller burning surface area during the remaining portion of the burning time.

A jet propelled device, such as a rocket consists mainly of a combustion chamber containing the propellent material, a nozzle of restricted cross-section formed at the rear of the chamber, and a payload carried by the motor. When the propellant, such as a double-base powder, composed of nitroglycerin and nitrocellulose, is ignited the gaseous combustion products pass through the nozzle with great velocity and thus propel the assembly toward the objective at which it is aimed. For a pressure to be built up within the combustion chamber the mass rate of formation of the gas must be greater than the mass rate of discharge through the nozzle.

The mass rate of formation depends upon the surface area and burning rate of the propellent material. For the particular propellant which I prefer to use, the mass rate of formation is equal to the product of the density, burning surface and its linear burning rate. Thus linear burning rate at constant ignition and powder temperature may be regarded as a linear function of the pressure. Likewise the rate of discharge of the products of combustion through the nozzle may also be regarded as a linear function of the pressure within the combustion chamber. The pressure at which the mass rate of formation is equal, substantially, to the mass rate of discharge is termed the equilibrium pressure and is the pressure at which the rocket can be made to operate.

It can be shown that the pressure at which the rocket is to operate is dependent upon the ratio of the total burning surface area of the propellant to the throat area of the nozzle, and further that the rate of pressure increase is also dependent upon this ratio. Consequently, if all other factors in design are fixed the ratio required to produce the maximum pressure also establishes the time required to attain the maximum as equilibrium pressure, since the rate of rise in pressure is dependent upon surface, linear burning rate and chamber volume. Thus in prior designs where burning continues at equilibrium pressure, the time required to attain this equilibrium pressure is dependent upon the particular equilibrium pressure at which the rocket is to operate.

In many rocket applications, there are certain advantages to be obtained by keeping the burning time down to a minimum. If the burning time can be reduced, preferably by obtaining a more nearly rectangular pressure time curve, the heat loss through the walls of the rocket motor will be reduced resulting in higher thermal efficiencies.

Furthermore, since the mechanical strength of the combustion chamber decreases as its temperature increases, a long burning time results in higher chamber temperatures and a reduction in mechanical strength. For this reason it is also desirable to keep the burning time at a minimum.

A reduction in burning time also results in a reduction in the erosion of the nozzle due to heat being transmitted thereto. However, the foremost advantage resulting from a reduction of burning time is the increase in accuracy obtained as a result of this reduction. It is known that the dispersion in free flight of a rocket propelled projectile is a function of the cube of the free flight burning time. Consequently, even small reductions in burning time produce significant reductions in dispersion.

In a prior application Ser. No. 545,809, filed July 20, 1944, now Patent No. 2,712,283, I have shown a propellant arrangement within a rocket motor combustion chamber which is particularly advantageous for obtaining burning times of extremely short duration. The type of propellant arrangement therein disclosed is especially useful in those cases wherein all the burning must be completed within the length of the projector. Results obtainable with this propellent arrangement are superior to those obtained by prior attempts at reducing total burning time by reducing the web thickness of the propellant. These prior constructions in which burning continues at equilibrium pressures have been characterized by low velocities, high pressures, high accelerations, and low efficiency (due to an increase in percent loss of propellant). I have been concerned with developing a rocket propellent assembly which will continue to burn under equilibrium conditions and I have sought ways of reducing the total burning time without entailing the disadvantages enumerated above.

As a result of my researches with the type of propellent arrangement described in the aforementioned invention disclosure, I obtained a substantially vertical rise in pressure, and it occurred to me that if I could obtain a vertical rise to peak pressure at which the burning is completed, why could not I also obtain a substantially vertical rise to an equilibrium or desired pressure at which burning continues; and by so doing obtain a reduction in the total burning time. I sought ways by which I could bring the pressure to the desired value quickly while still having a further quantity of propellant available for continued combustion at this equilibrium pressure value. I discovered a way by which this result could be achieved when I finally hit upon the idea of utilizing a plurality of thin web grains of propellant to provide for this sudden rise in pressure and to have these thin web grains consumed entirely within the time required to attain this desired pressure. The remaining burning surface which constitutes the primary driving charge would have a burning surface area sufficient only to provide the mass rate of formation of gases of combustion necessary to maintain this pressure, substantially, for the remaining portion of the total burning time. In this manner I have been able to reduce the total burning time in rockets without encountering the disadvantage of prior propellent arrangements wherein the time required to attain equilibrium pressure is fixed substantially by that equilibrium pressure.

It is a primary object of this invention, therefore, to provide a rocket with a propellant which has a large burning surface area during that portion of the time required to attain a desired pressure and a smaller surface area for burning at this desired pressure.

In the appended drawings:

Figure 1 is a plot on the same coordinates of the relation of the rate of formation, and rate of discharge as a function of pressure;

Figure 2 is a plot of the maximum pressure as a function of the ratio of total burning surface to nozzle throat area;

Figure 3 is a plot of a number of pressure-time curves for rockets designed to operate at different equilibrium pressures; and different K's.

Figure 4 is a plot of a pressure-time curve for a rocket propellent assembly of my invention;

Figure 5 is an elevational view in section of a preferred embodiment of a rocket propellent assembly capable of producing a pressure time curve substantially as shown in Fig. 4;

Figure 6 is an enlarged view of the propellant shown in Fig. 5;

Figure 7 is a longitudinal sectional view of a solid powder grain which may be used in the practice of the present invention; and Figure 8 is a section on the line 8—8 of Fig. 7.

Referring now to Fig. 1 there is shown a curve representing the mass rate of formation of the gas from a double-base propellant at a particular powder and ignition temperature $T_p$ and $T_i$ respectively. As illustrated the mass rate of formation at constant temperature is a linear function of the pressure and may be expressed thus:

$$\bar{M} = pS(A+BP) \quad 1$$

For given values of $p$ and $S$, where $p$ is the density and $S$ the powder surface area (both density and powder surface area are assumed to remain constant), and $A$ and $B$ are constants for a given powder, the mass rate of formation $\bar{M}$ is proportional to $P$, the pressure in pounds per square inch. There is also shown on the same coordinates a plot of the rate of discharge of the products of combustion through the nozzle as a function of the pressure. It is to be noted that at pressure $P_1$ the rate of formation is equal to the rate of discharge. This establishes the equilibrium point of operation for the rocket.

In order to attain this pressure $P_1$ it is to be noted from Fig. 2 (showing the relationship of maximum pressure to K, a ratio of the burning surface area S of the powder to throat area A of the nozzle) that this pressure can be attained only when the value of $S_1/A$ is equal to $K_1$. Furthermore, from Fig. 3 (showing the plot of the pressure time relationship within a rocket motor combustion chamber for various values of $K=S/A$, it is noted that for a value of $S_1/A$ equal to say $K_1$ the time required to attain an equilibrium pressure is equal to $t_1$, almost one-half the total burning time $T_o$.

In my invention I have been able to obtain pressure time curves as shown in Fig. 4 by selecting a rocket motor and propellent assembly having a large surface area $S_2$ so that the ratio of $S_2/A$ will be equal to $K_2$ wherein $K_2$ is greater than $K_1$. From Fig. 3 it is noted that the time $t_2$ required for the pressure to build up to a value equal to $P_1$ is considerably less than the time $t_1$ and further that as the burning continues the pressure continues to rise to a value of $P_2$. By virtue of my invention, however, I am able to prevent the pressure from rising beyond $P_1$ by utilizing a plurality of thin web propellent grains having a surface area $S_a$; the thickness of the web of these grains being determined by the burning rate (from Fig. 1) so that within a time $t_2$ this thin web propellant will be entirely consumed. When this thin web is consumed upon attaining a pressure $P_1$ the burning will continue along the equilibrium portion shown in Fig. 4. This continued burning is accomplished by providing also a plurality of propellent grains of surface area $S_1$ having a web thickness much larger than the web thickness of the grains of area $S_a$. The ratio of the surface area $S_1/A$ is equal to $K_1$ to provide continued burning at a pressure $P_1$. The ratio of the surface area $S_2$ is equal to $$\frac{S_a+S'}{A}$$

which in turn is equal to $K_2$ so that the burning will proceed along the steep portion $o$—$a$ of the pressure time curves of Figs. 3 and 4.

One of the difficulties in the use of thin web powder is that of trapping. That is, with thin web grains a greater portion of the propellant in unburned form is discharged from the nozzle. Furthermore, cylindrical grains having a single perforation when made in thin web require a large volume of chamber to hold the powder having the required surface area and weight. By utilizing a grain formation or assembly as illustrated in Fig. 5 wherein the burning of the propellant selected to control the rate of pressure increase is in laminar layers disposed generally transversely to the longitudinal axis of the rocket motor chamber I can avoid the prior difficulties in trapping and can easily acquire an adequate density of loading. I believe, therefore, that in order to successfully practice this invention the thin web propellant which is provided to control the time rate of increase in pressure should have opposed laminar burning faces designated as $S'$. The thickness in powder between these faces is of course less than the web thickness of the main driving charge.

In Fig. 5 I have shown a rocket motor chamber 10 having a head 11 affixed to its upper end adapted to contain a pay load and a nozzle 12 at the lower end. The motor chamber 10 is secured to the head at the front end so that the plate 13 of the head forms a partition and provides a support to which the rod 14 can be secured. The propellent assembly 15 comprises a plurality of discs of propellent material strung on the rod 14 and retained in place by the washer 16 and nut 17. The washer 16 is preferably of about the same diameter as the propellent discs. These discs which go to make up the assembly are of different web thicknesses. The discs 20 of a thickness $B_1$ constitute what I term the primary driving charge and provide a surface area $S_1$ so that the ratio of $S_1/A$ (where A is the cross-sectional area of the throat 12), will produce equilibrium burning at the pressure $P_1$. The surface area $S_a$ of the discs 21 of the thickness $B_2$ (less than $B_1$) which contributes to the rate of pressure increase is selected so that the ratio of $$\frac{S'+S_a}{A}$$

will produce the desired rate of pressure increase. The thickness $B_2$ of the discs 21 is selected so that the burning of the grains will be completed in the time interval required to obtain the equilibrium pressure P.

It should be understood that other means than those disclosed may be devised for practicing this invention. In fact, a single grain of propellant may be adapted to produce the same result as that obtained by the propellent assembly shown in Fig. 5. This grain may be cylindrical in configuration with a single concentric cylindrical perforation so that the area of the inner and outer circumferential surface constitute the $S_1$ required to produce burning at a K equal to $S_1/A$, and may be provided with a plurality of transverse slots such that their opposed faces produce a total surface area of $S'+S_a$ to give a K equal to $$\frac{S'+S_a}{A}$$

required to achieve the desired rate of pressure increase. In this type of design of propellant grain the thickness of powder between the slots must be less than the total web thickness of the grain, so that in a time interval $t_1$ required to burn through a web thickness equal to the distance in powder between faces of the slots, a cylindrical grain will remain which continues to burn at the selected pressure P. Thus, instead of using an assembly of discs or washer-like grains 20 of propellent material, as shown in Figs. 5 and 6, a single grain as illustrated in Figs. 7 and 8 may be used. The single grain illustrated in Figs. 7 and 8 may be a solid cylinder 30 of propellent material with an axial perforation 31 therethrough to receive a trap rod 32, provided with a washer 33 and nut 34 at the lower end of the grain as viewed in Fig. 7. This grain is provided with transverse slots 35 therein over one portion of its length. These transverse slots or grooves may be cut into the cylindrical grain from its outer surface toward its axis, the slots being close enough together to provide a number of thin annular webs 36 of propellent material therebetween, for the purpose of causing a rapid initial pressure increase during burning, such as is produced by the thin discs 21 of the assembly illustrated in Figs. 5 and 6. The slots may extend completely around the circumference of the single cylindrical grain and into the grain only a portion of the radial thickness of the grain, thereby producing a number of thin annular webs 36 of propellent material extending outward from a central or hub portion 37 of the grain.

I claim:

1. In a jet propelled device the combination including a combustion chamber, a primary driving charge contained within said chamber, said charge including a powder grain having surfaces ignitable to generate a propellent fluid under pressure, and an initial rate of pressure increase controlling charge contained within said chamber, said rate of pressure increase controlling charge comprising a propellant having a plurality of opposed burning faces, the powder thickness between the burning surfaces of said primary driving charge being sufficiently greater than the thickness in powder between the burning faces of said pressure controlling charge whereby said controlling charge will be entirely consumed prior to said primary driving charge to decrease the time required to attain the operating pressure of said primary charge, the burning surface of said primary charge being dimensioned to maintain substantially constant operating pressure once this pressure is attained.

2. In a jet propelled device the combination including, a combustion chamber, a driving charge contained within said combustion chamber for generating a propellent fluid under pressure comprising a plurality of separate plates of propellent material of different thicknesses, and means for supporting a stack of said plates longitudinally within the chamber.

3. In a jet propelled device the combination including, a combustion chamber, a primary driving charge supported within said chamber, a laminated powder charge comprising a plurality of separate plates of propellent material, the thickness of said plates being less than the web thickness of said primary driving charge and means supporting a stack of said laminations longitudinally within said chamber.

4. In a jet propelled device the combination of a combustion chamber, a combustible propellent material contained within said chamber, an exit orifice of cross-sectional area A formed in said chamber for the high velocity discharge of the products of combustion formed by the burning of said propellent material, said propellent material consisting of a plurality of grains having opposed laminar burning surfaces $S'$ and of web thickness $B_2$ and burning area $S_a+S'$ selected to burn at the pressure corresponding to the ratio of $$\frac{S_a+S'}{A}$$

for a time interval $t_2$ and a plurality of grains of web thickness $B_1$ and burning area $S_1$ selected to produce a rate of pressure increase corresponding to the ratio of $$\frac{S'}{A}$$

the web thickness $B_1$ being greater than the web thickness $B_2$ so that at a time interval $t_2$ required to attain the pressure $P_1$ the grains of surface area $S_a+S'$ of smaller web thickness will be consumed entirely.

5. In a rocket motor including an exit orifice adjacent its rear end, a driving charge received in said chamber, said exit orifice communicating with said chamber to provide a mass rate of discharge of the products of combustion of said driving charge proportional substantially to pressure, said driving charge comprising a first plurality of separate thin plates of propellent material forming a controlling charge having opposed laminar burning surfaces, and a second plurality of separate thick plates forming a primary charge, and means for supporting said plates longitudinally within said chamber, said first plurality of plates having a large initial burning surface to provide upon combustion a mass rate of formation of combustion products greater than the mass rate of discharge through said orifice, said second plurality providing an abrupt decrease of burning surface at a preselected pressure and at a selected time interval to entirely consume said first plurality of plates, whereby the mass rate of formation equals substantially the mass rate of discharge of said combustion products.

6. In a jet propelled device, the combination including a combustion chamber and an exit orifice, a single driving charge supported longitudinally within said chamber, a portion of one end of said charge having a plurality of transverse slots cut therein to provide a number of annular webs of propellant, said slotted portion having a burning surface to provide a rate of pressure increase within said chamber to attain an equilibrium pressure at a preselected time interval, the remaining solid cylindrical portion of said charge having a burning surface less than the burning surface of said slotted portion to substantially maintain said equilibrium pressure in said combustion chamber, said slotted portion being entirely consumed when said equilibrium pressure at said preselected time interval is achieved.

References Cited in the file of this patent

UNITED STATES PATENTS

| | | |
|---|---|---|
| 1,901,852 | Stolfa et al. | Mar. 14, 1933 |

FOREIGN PATENTS

| | | |
|---|---|---|
| 516,865 | Great Britain | Jan. 12, 1940 |